United States Patent
Nass

(10) Patent No.: US 8,597,542 B2
(45) Date of Patent: Dec. 3, 2013

(54) LUMINOUS SUBSTANCES BASED ON EU2+-(CO-)DOPED MIXED GARNET CRYSTALS AND PRODUCTION AND USE THEREOF

(75) Inventor: Peter Nass, Mainz (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 13/319,361

(22) PCT Filed: May 7, 2010

(86) PCT No.: PCT/EP2010/002801
§ 371 (c)(1),
(2), (4) Date: Feb. 8, 2012

(87) PCT Pub. No.: WO2010/136116
PCT Pub. Date: Dec. 2, 2010

(65) Prior Publication Data
US 2012/0126173 A1 May 24, 2012

(30) Foreign Application Priority Data
May 8, 2009 (DE) .......................... 10 2009 020 569

(51) Int. Cl.
*C09K 11/08* (2006.01)
(52) U.S. Cl.
USPC .................................................. 252/301.4 F
(58) Field of Classification Search
USPC ..................... 252/301.4 R, 301.4 F
See application file for complete search history.

(56) References Cited

U.S. PATENT DOCUMENTS

| | | | | |
|---|---|---|---|---|
| 6,765,237 | B1 * | 7/2004 | Doxsee et al. | 257/98 |
| 2006/0219927 | A1 * | 10/2006 | Venkataramani et al. | 250/370.11 |
| 2007/0262288 | A1 * | 11/2007 | Naum | 252/301.4 F |
| 2009/0105065 | A1 * | 4/2009 | Bechtel et al. | 501/152 |

FOREIGN PATENT DOCUMENTS

EP 0936682 8/1999

OTHER PUBLICATIONS

Trofimov et al., "Cathodoluminescence properties of Yttrium Aluminum Garnet Doped with Eu2+ and Eu3+ ions", ( May 2007), Semiconductors vol. 41, No. 5, pp. 512-515.*
Trofimov et al., "Cathodoluminescence properties of yttrium aluminum garnet doped with Eu2+ and Eu3+ ions", Semiconductors 41: 512-515, May 1, 2007.
Fadlalla et al., "Synthesis and characterization of single crystalline YAG: Eu nano-sized powder by sol-gel method", Materials Chemistry and Physics 109: 436-439, Jan. 22, 2008.
Kang et al., "Luminescence Characteristics of Eu-Doped Calcium Magnesium Chlorosilicate Phosphor Particles Prepared by Spray Pyrolysis", Japanese Journal of Applied Physics 45: 1617-1622, Mar. 1, 2006.
International Search Report issued for International Application No. PCT/EP2010/002801 and dated Aug. 26, 2010.

(Continued)

*Primary Examiner* — Emily Le
*Assistant Examiner* — Lynne Edmondson
(74) *Attorney, Agent, or Firm* — Pearl Cohen Zedek Latzer Baratz, LLP

(57) ABSTRACT

The invention relates to luminous substances which contain $Eu^{2+}$ doping and at least one silicate mineral from the garnet group and/or a mono and/or polycrystalline yttrium-aluminum garnet (YAG) and/or a luminous substance derived from $Y_3Al_5O_{12}$ by partial or complete substitution, and to the production and use thereof.

8 Claims, 3 Drawing Sheets

(56) References Cited

OTHER PUBLICATIONS

Kazuo Narita, Phosphor Handbook (CRC Press Laser and Optical Science and Technology) (Yen et al. Eds.), $2^{nd}$ Edition, "Methods of Phosphor Synthesis and Related Technology", Chapter Four, Section One, Dec. 1, 2006, pp. 341-380.

* cited by examiner

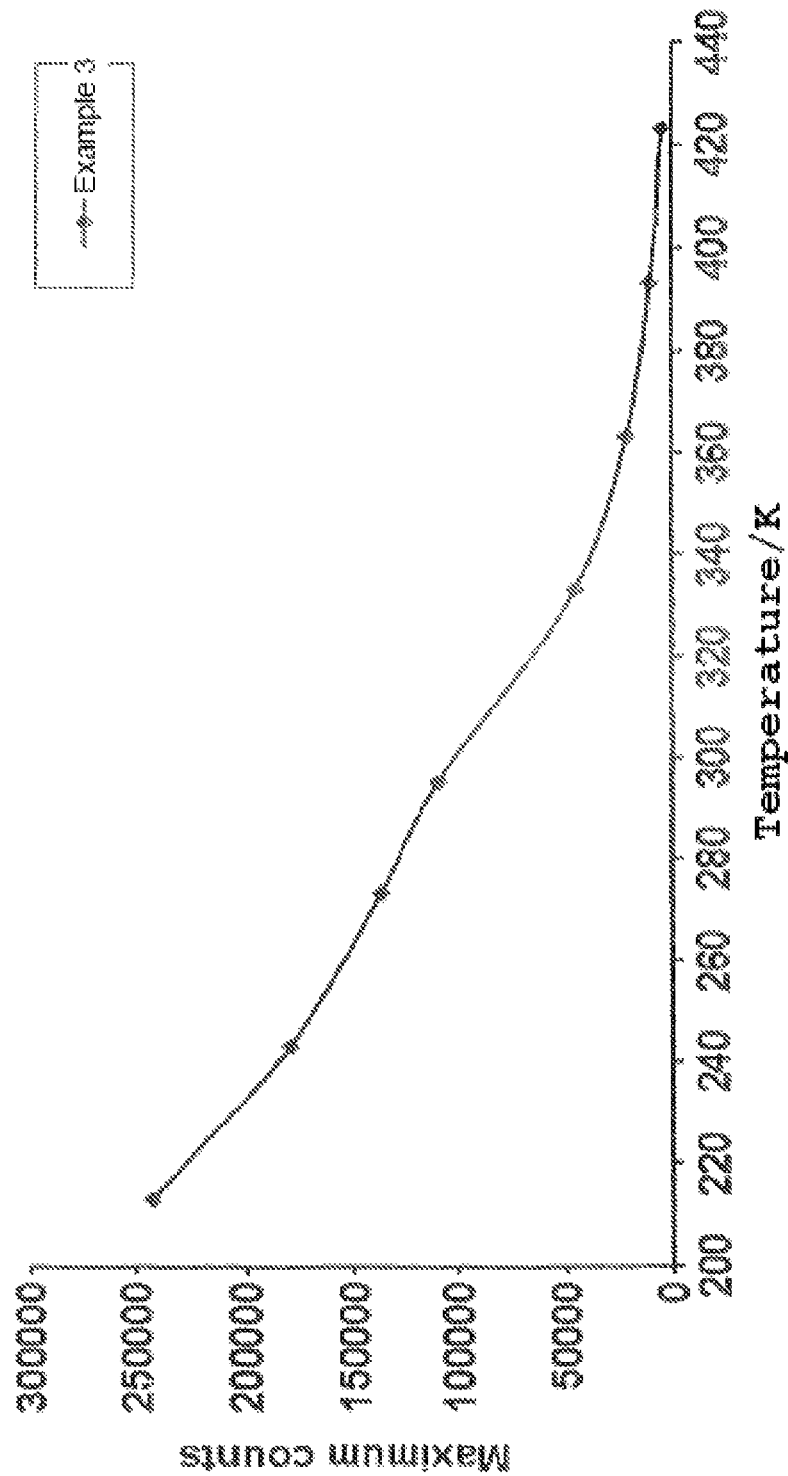

LUMINOUS SUBSTANCES BASED ON EU2+-(CO-)DOPED MIXED GARNET CRYSTALS AND PRODUCTION AND USE THEREOF

CROSS-REFERENCE TO RELATED APPLICATIONS

This application is a National Phase Application of PCT International Application No. PCT/EP2010/002801, International Filing Date May 7, 2010, claiming priority of German Patent Application 10 2009 020 569.1, filed May 8, 2009, which are hereby incorporated by reference in their entirety.

FIELD OF THE INVENTION

The invention relates to luminous substances based on $Eu^{2+}$-doped or $Eu^{2+}$-codoped mixed garnet crystals and the production and use of said luminous substances, among other things, in phosphor-converted light sources (LED, LD, fluorescent lamps and displays).

BACKGROUND

Luminous substances are used in a wide range of uses, for example in the field of lighting and plasma displays. The function of the luminous substances consists in transforming or converting light of relatively short wavelength (in particular UV radiation <380 nm) into colored light of longer wavelength. Since the emitted light has less energy than the excitation light, this conversion is also designated as "down conversion".

In fluorescent lamps, usually, a combination of three luminous substances is used in order to convert the UV radiation emitted by the filling gas during discharging into visible radiation of the colors blue, green and red. By suitable mixing ratios and covering densities on the cladding tube, for example, white light with different color temperature such as cool white (ca. 7000 K) to warm white (ca. 3000 K) can be generated. Similar systems are used in plasma displays.

With the development of UV LEDs and blue LEDs of high power densities, luminous substances play an important role when converting these light sources into white light. Thus, yellow emitting luminous substances are used in combination with blue LEDs in order to generate white light from the mixture of partially transmitted blue light and yellow fluorescence radiation.

since in contrast to fluorescent tubes and plasma displays, the luminous substances in the LEDs are not hermetically encapsulated, their stability against external influences is of increased significance in case of LED uses.

It is known that sulphide-based luminous substances, for example Eu:Srs, are very moisture-sensitive and their conversion efficiency decreases accordingly over time; the color of the respective LEDs thereby shifts successively toward blue. The same applies to the thiogallates such as (Ba, Ca, Sr, Eu)$Ga_2S_4$ or the orthosilicates such as (Ba, Ca, Sr, Eu) $SiO_4$.

Besides a limited chemical stability, luminous substances also change under temperature load. With increasing temperature, irreversible damage to the luminous substance can occur, which results in a lower quantum efficiency and thus quasi in failure of the luminous substance. Usually, the temperatures necessary for this are not reached during the operation of an LED; however, when processing the luminous substance into a conversion element (e.g. glazing the luminous substance), it has to be ensured that no temperature-related damages to the luminous substances occur. In addition, luminous substances also show a reversible efficiency change with temperature, namely an increase of efficiency with decreasing temperature and a decrease with increasing temperature. As a result of this so-called thermo-quenching effect, the color of the light emitting diode changes during temperature fluctuations, which can also be caused by the LED itself (e.g. during changes of the power input).

Color changes of the LEDs are an undesirable technical phenomenon and their elimination or minimization thus represents a development objective.

In this connection, CE:$Y_3Al_5O_{12}$ (cerium-doped yttrium-aluminum garnet or Ce:YAG) has established itself as a yellow luminous substance for phosphor-converted white LEDs. Ce:YAG is very thermally stable (up to 800° C.) and shows low thermo-quenching.

In connection with blue LEDs which emit in the spectral range of ca. 440-480 nm and with a suitable coverage density, Ce:YAG generates white light, is sufficiently chemically and thermally stable, and has a high quantum efficiency.

The fluorescence maximum of Ce:YAG lies at approximately 550 nm; however, as described for example in the document EP 0936682, by forming mixed crystals, it can be shifted into the range of longer wavelength; for this, for example, replacing $Y_2O3$ with $Gd_2O_3$ is suitable.

In this manner it is principally possible to generate color temperatures between 3000 K and 8000 K; however, due to the low quantum efficiency, the achievable efficiencies, mainly in the region of low color temperatures, are insufficient.

Another disadvantage is created in that due to the specific spectral distribution of the "white" light generated in this manner, certain color components in the spectrum can be rendered only to a limited extent, and thus the color rendering index for these systems is usually limited to values below 75.

SUMMARY OF THE INVENTION

The object of the present invention therefore was to provide a luminous substance which covers the entire visible spectral range as wide as possible, has a high quantum yield and a high chemical and thermal stability.

It should be possible to excite the luminous substance to be developed with a primary light source emitting in the blue or near UV range and said luminous substance should meet the requirements mentioned below:

high chemical and thermal stability,
wide coverage of the visible spectral range between 380 nm and 780 nm, in particular between 500 and 650 nm,
implementation of color temperatures in the range between 10000 K and 2500 K, in particular between 4500 K and 2500 K,
implementation of the color coordinates in the above-mentioned range of the Planck curve with high color rendering indices (if possible CRI>85).

The mentioned and further objects of the present invention are achieved by the features of the claim 1.

Preferred embodiments of the invention are comprised by the sub-claims.

The luminous substance according to the invention contains $Eu^{2+}$ doping and at least one silicate mineral from the garnet group and/or a monocrystalline and/or polycrystalline yttrium-aluminum garnet (YAG) and/or a luminous substance derived from $Y_3Al_5O_{12}$ by partial or complete substitution.

Preferably, besides $Eu^{2+}$ doping, the luminous substance according to the invention contains additional doping with $Si^{4+}$ and/or $Zr^{4+}$, wherein an exclusive co-doping with $Zr^{4+}$ is particularly preferred.

In particular, the luminous substance according to the invention contains at least one luminous substance derived from YAG, which substance is characterized by the formula $$(Y_{1-w-2x-y}Gd_wEu^{2+}_xM_xRE_y)_3(Al_{1-z}Ga_z)_5O_{12},$$

wherein x corresponds to a numerical value of greater than 0 up to a maximum of 0.1, y to a numerical value of 0 to less than 1, z to a numerical value of 0 to 1, and w to a numerical value of greater 0 to 1−2x−y, M represents Si and/or Zr, and RE designates the elements of the rare earth metals.

In one advantageous embodiment, w=1−2x−y applies and/or z=1 applies; furthermore, in a special embodiment, w=0 applies.

Also, it is advantageous if RE represents Ce and/or Sm and/or Tb.

In particular, RE is at least partially Sm, and z is a numerical value greater than 0.

Another advantageous embodiment of the invention is in addition characterized in that x corresponds to a numerical value of greater than 0 up to a maximum of 0.08.

Finally, according to the invention, it is an advantage if the luminous substance, in addition to one of the aforementioned luminous substances, contains at least one further luminous substance with a different chemical composition.

As additional (further) luminous substances for the present invention, $Ce^{3+}$-doped luminous substances, in particular $Ce^{3+}$-doped silicate minerals from the garnet group, have proven themselves.

Furthermore, $Ce^{3+}$-doped monocrystalline and/or polycrystalline yttrium-aluminum garnets or luminous substances derived from YAG and doped with $Ce^{3+}$ have proven themselves as additional luminous substances.

Preferably, the chemical composition of the additional luminous substance (substances) differs (differ) only by $Ce^{3+}$ doping or a different $Ce^{3+}$-ion content.

In a special embodiment it has been found to be advantageous if europium doping is exclusively $Eu^{2+}$ doping or the $Eu^{3+}$ content in the luminous substance systems according to the invention is less than 1 mole % of the entire europium doping.

With regard to luminous substances, up to now, it was only known that YAG represents an ideal host lattice for different activator centers, wherein previously in particular cerium-doped converter phosphors were used for white LEDs.

Furthermore, doped YAG crystals are used as active materials for laser applications (e.g. Nd:YAG, Yb:YAG, Er:YAG).

Monocrystals of Ce:YAG are used, among other things, as scintillators, whereas polycrystalline CE:YAG powders are used as luminous substances for white LEDs.

Within the research work resulting in the present invention it was found that not only $Eu^{3+}$ mixtures with a molar main portion of trivalent europium ions are suitable for doping silicate minerals from the garnet group, yttrium-aluminum garnet and materials derived therefrom, but that the exclusive or predominant use of divalent europium ions is also possible for this purpose.

From a crystallographic point of view, thus from the view of an expert typically concerned with the development of new luminous substances, this result is very surprising.

Furthermore, it is completely unexpected that the luminous substances according to the invention fulfill the requirements for generating "white" light to a remarkably high degree and, at the same time, provide remarkably good application-related properties.

Designated as silicate minerals from the garnet group in the meaning of the present invention are substances, the chemical composition of which is characterized by the formula $$X^{II}_3Y^{III}_2(SiO_4)_3,$$

wherein $X^{II}$ stands for divalent calcium, and/or magnesium, and/or iron, and/or manganese, and $Y^{III}$ stands for trivalent aluminum, and/or iron, and/or titanium, and/or vanadium, and or chromium.

Materials or luminous substances derived from YAG are to be understood in this connection as substances, the chemical composition of which is derived from the molecular formula $Y_3Al_5O_{12}$ of YAG by partial or complete substitution, for example, by completely replacing yttrium with gadolinium $(Gd_3Al_5O_{12})$.

With respect to the color coordinates to be implemented and the color rendering indices, the new luminous substances fulfill the objects of the present invention to a remarkably high degree, which was not known from the prior art.

For achieving particularly good results, the luminous substances according to the invention are combined with primary light sources emitting in the near UV range and in the blue spectral range.

It was already known that doped yttrium-aluminum garnets and luminous substances derived from YAG have the required high chemical and thermal stability; as an example, reference is made in this connection to cerium-doped yttrium-aluminum garnets which, due to their particular stability, are widely used as luminous substances.

since the luminous substances according to the invention from the group of yttrium-aluminum garnets or the substances derived therefrom have the same host lattice as the predominantly used luminous substances (Ce:YAG), their scattering behavior is identical, and adaptation of the layout of the LEDs is therefore obsolete.

Also, combining these luminous substances according to the invention with the conventional cerium-doped yttrium-aluminum garnets, which usually are dispersed in silicone or glass, does not change the scattering behavior of the conversion element.

The luminous substances according to the invention can be produced with methods known per se as described, amongst other things, in the fourth chapter of the "Phosphor Handbook" (publisher: Yen, Shionoya and Yamamoto, publishing house: CRC Press, $2^{nd}$ edition 2007).

A peculiarity of the production of the luminous substances according to the invention is the need of maintaining greatly reducing reaction conditions because otherwise, the application-related suitability of the luminous substances is significantly affected. These reaction conditions can be ensured, for example, by maintaining a partial pressure of oxygen below $10^{-6}$ mbar.

Also, a ceramic production method can be used in which transparent, polycrystalline molded bodies, so-called optoceramics, are obtained.

With this method, the oxidic base materials are processed in the form of nanoscale powders, pressed and subsequently sintered.

Moreover, the luminous substances according to the invention can be obtained with known but relatively complicated crystal growing methods.

The use of the new luminous substances is principally possible in all fields of use in which luminous substances have already established themselves.

The preferred field of use is the different potential uses for producing white light emitting diodes. For example, in connection with a blue LED, a green/yellow luminous substance can be combined with a red luminous substance according to the invention, whereby in a material class, a conversion into white light with high color rendering is made possible.

The luminous substances according to the invention of the entire visible spectral range can also be used for producing fluorescent lamps and plasma displays.

Furthermore, a use as X-ray luminous substance can take place if Y is replaced—preferably completely—with heavy elements such as Gd and Tb; the position of the emission band is of minor importance for this field of use.

Finally, in the form of a monocrystalline or optoceramic, highly transparent material, a use as a scintillator is also possible.

BRIEF DESCRIPTION OF THE DRAWINGS

FIG. 3 illustrates measurement of a fluorescence intensity.

DETAILED DESCRIPTION

Examples and Comparative Examples

The invention is described in more detail hereinafter by means of examples.

However, the luminous substances according to the invention are illustrated only exemplary.

A limitation of the embodiments of the invention to the examples given below is expressively not the case.

Three luminous substances of the general formula $(Y_{1-w-2x-y}Gd_wEu^{2+}{}_xM_xRE_y)_3(Al_{1-z}Ga_z)_5O_{12}$ were exemplary examined, the chemical composition of which substances is shown in the following table:

|  | Y(1 − w − 2x − y) | Gd(w) | Eu/Zr(x) | RE(y) | Ga(z) |
|---|---|---|---|---|---|
| Example 1 | 0.952 | 0 | 0.024 | 0 | 0 |
| Example 2 | 0.752 | 0.2 | 0.024 | 0 | 0 |
| Example 3 | 0.152 | 0/8 | 0.024 | 0 | 0 |

Figure 1:
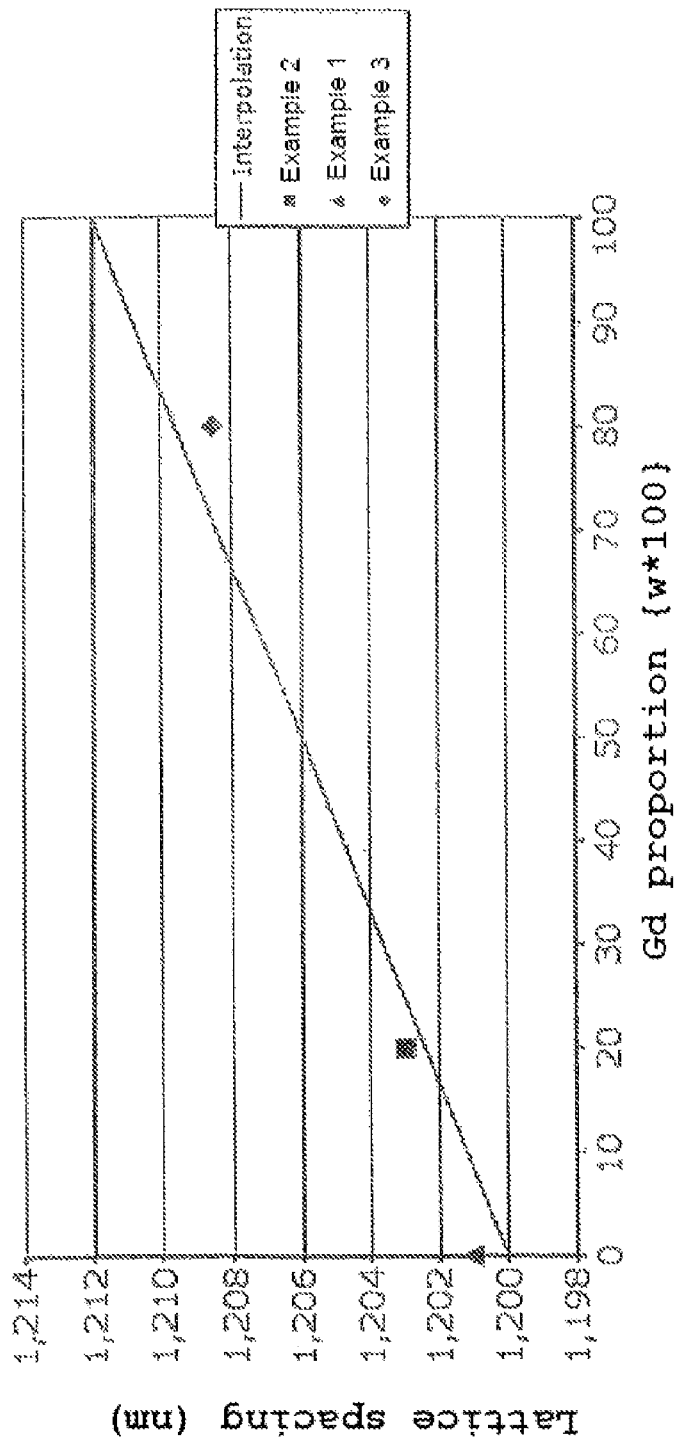
FIG. 1 shows the expected values and the expected increase for partial replacement of Y by Gd.

Lattice Spacing of the Luminous Substance Examples:

Crystal phases and lattice constants were determined with X-ray diffraction analyses and Rietveld simulation. For pure $Y_3Al_5O_{12}$, the lattice constant is 1.200 nm, for $Gd_3Al_5O_{12}$, it is 1.212 nm. The measured lattice constants, which are shown in FIG. 1 show the expected values and the expected increase for partial replacement of Y by Gd.

Emission Bands of the Examples

Figure 2:
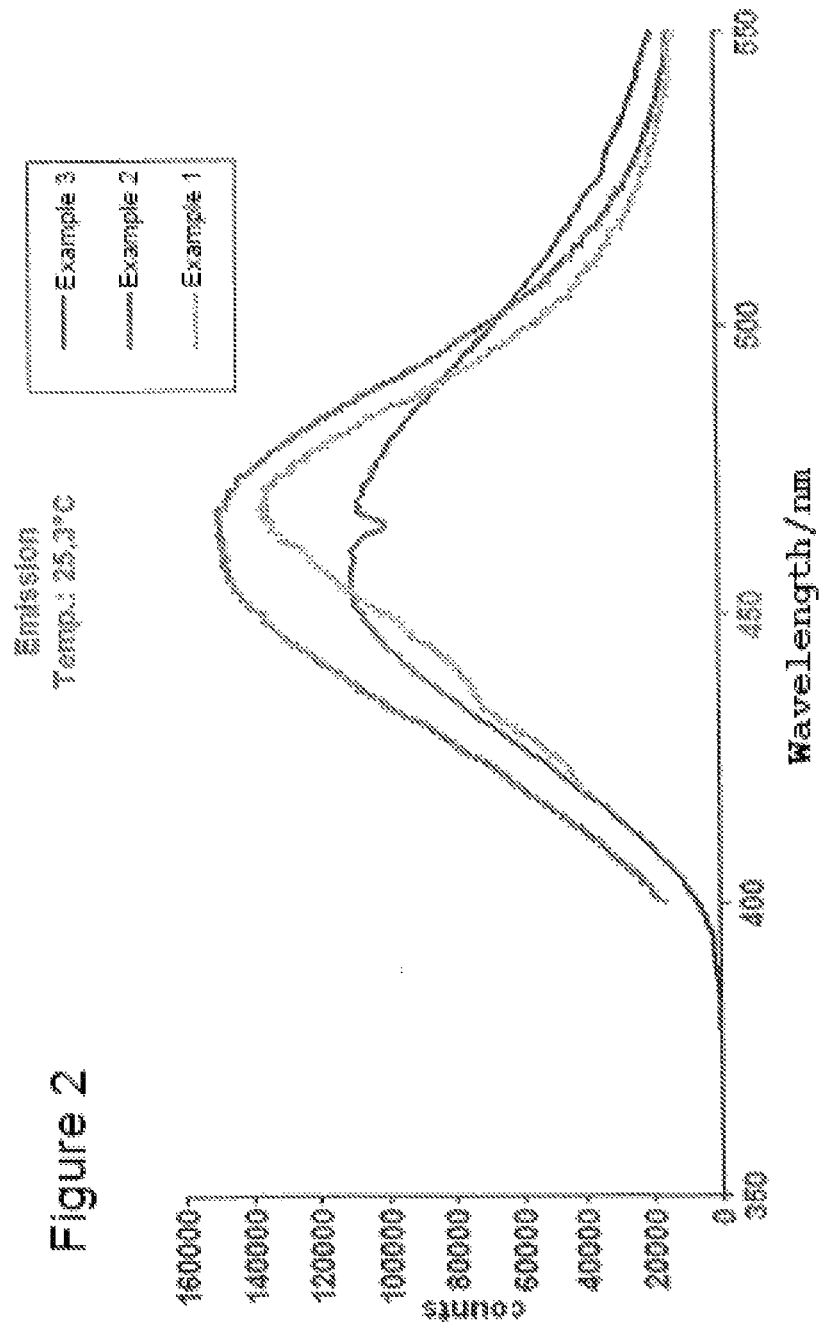
FIG. 2 shows the result of a measurement.

The luminous substances were excited with monochromatic UV light (Xe light source with monochromator) and the fluorescent light was detected spectrally resolved at an angle of 90 degrees by means of a monochromator. The result of this measurement is shown in FIG. 2.

Thermo-quenching Based on Example 3

The fluorescence intensity was measured at the maximum of the emission spectrum at fixed excitation as a function of the sample temperature (sample is located in a measuring cell heated in a controlled manner), illustrated in FIG. 3.

The invention claimed is:

1. A luminous substance containing a monocrystalline or polycrystalline garnet represented by the formula:

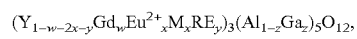

$(Y_{1-w-2x-y}Gd_wEu^{2+}{}_xM_xRE_y)_3(Al_{1-z}Ga_z)_5O_{12}$, wherein x corresponds to a numerical value of greater than 0 up to maximum of 0.1, y to a numerical value of 0 to less than 1, z to a numerical value of 0 to 1, and w to a numerical value of greater 0 to 1−2x−y, M represents Si and/or Zr, and RE designates the elements of the rare earth metals and containing $Eu^{2+}$ doping and doping with $Si^{4+}$ and/or $Zr^{4+}$, wherein $Eu^{2+}$ content of said luminous substance is less than 1 mole % of the entire europium doping.

2. The luminous substance of claim 1, wherein w=1−2x−y or z=1.

3. The luminous substance of claim 1, wherein RE represents Ce or Sm or Tb.

4. The luminous substance of claim 1, wherein RE is at least partially Sm, and z is a numerical value greater than 0.

5. The luminous substance of claim 1, wherein x corresponds to a numerical value of greater than 0 up to a maximum of 0.08.

6. The luminous substance of claim 1, wherein said luminous substance contains in addition at least one further luminous substance with a different chemical composition.

7. The luminous substance of claim 6, wherein as a further luminous substance, $Ce^{3+}$-doped luminous substances are used.

8. The luminous substance of claim 6, wherein the chemical composition of the further luminous substance differs only by a $Ce^{3+}$ doping or a different content of $Ce^{3+}$ ions.

* * * * *